US012686618B2

(12) United States Patent
Cheng et al.

(10) Patent No.: US 12,686,618 B2
(45) Date of Patent: Jul. 21, 2026

(54) METHOD FOR PREPARING NANO-GRAPHENE OXIDE BY ELECTROCHEMICALLY EXFOLIATING CARBON FIBER MATERIAL

(71) Applicant: Zhejiang University, Hangzhou (CN)

(72) Inventors: Shaoan Cheng, Hangzhou (CN); Longxin Li, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 987 days.

(21) Appl. No.: 17/941,015

(22) Filed: Sep. 8, 2022

(65) Prior Publication Data

US 2023/0399232 A1      Dec. 14, 2023

(30) Foreign Application Priority Data

May 19, 2022     (CN) .......................... 202210553260.6

(51) Int. Cl.
*C01B 32/198*          (2017.01)
*C01B 32/19*           (2017.01)
(Continued)

(52) U.S. Cl.
CPC ............ *C01B 32/198* (2017.08); *C01B 32/19* (2017.08); *C01B 32/196* (2017.08); *C25B 1/01* (2021.01);
(Continued)

(58) Field of Classification Search
CPC ..... C01B 32/198; C01B 32/19; C01B 32/196; C01B 2204/32; C01B 32/23; C25B 1/01;
(Continued)

(56) References Cited

U.S. PATENT DOCUMENTS

2018/0186645 A1*   7/2018  Xu ........................ C01B 32/198

FOREIGN PATENT DOCUMENTS

CN          107215867 A      9/2017
WO      WO-2016203388 A1 * 12/2016   ............... C25B 1/00

OTHER PUBLICATIONS

"Quest Calculate™ Phosphate Buffer (pH 5.8 to 7.4) Preparation and Recipe." AAT Bioquest, Inc., Jul. 18, 2019 [rtrvd on Sep. 2, 2025]. rtrvd from the internet <URL: https://web.archive.org/web/20190718150154/https://www.aatbio.com/resources/buffer-preparations-and-recipes/phosphate-buffer-ph-5-8-to-7-4> (Year: 2019).*

(Continued)

*Primary Examiner* — Coris Fung

(57)          ABSTRACT

The present disclosure relates to the technical field of nano materials and aims to provide to a method for preparing nano-graphene oxide by electrochemically exfoliating a carbon fiber material. The method includes the following steps: building an electrochemical reaction system by using a raw material with a carbon fiber as a basic structural unit as an anode, a metal or graphitic carbon material as a cathode, and a phosphate buffer solution with a neutral pH as an electrolyte; in an electrolysis process, gradually exfoliating a carbon fiber in the anode raw material and dispersing the carbon fiber in the electrolyte solution to generate graphene oxide; centrifuging to separate the reacted electrolyte solution, taking upper dispersion liquid, and washing away residual anions and cations; and performing ultrasonic treatment to obtain nano-graphene oxide dispersed in water and free of impurities.

9 Claims, 3 Drawing Sheets

(51) Int. Cl.
    *C01B 32/196*    (2017.01)
    *C25B 1/01*    (2021.01)
    *C25B 1/50*    (2021.01)
    *C25B 15/08*    (2006.01)

(52) U.S. Cl.
    CPC .............. *C25B 1/50* (2021.01); *C25B 15/085*
        (2021.01); *C01B 2204/32* (2013.01); *C01P*
        *2002/82* (2013.01); *C01P 2002/85* (2013.01);
        *C01P 2004/04* (2013.01)

(58) Field of Classification Search
    CPC ......... C25B 1/50; C25B 15/085; C25B 1/135;
        C25B 11/043; C01P 2002/82; C01P
        2002/85; C01P 2004/04; C01P 2004/62;
        C01P 2004/64; Y02E 60/13; B82Y 30/00
    USPC ...................................................... 423/415.1
    See application file for complete search history.

(56)               References Cited

OTHER PUBLICATIONS

Pei Yu et al., Mechanically-Assisted Electrochemical Production of Graphene Oxide, Chemistry of Materials, Oct. 31, 2016, pp. 8429-8438, vol. 28.

* cited by examiner

METHOD FOR PREPARING NANO-GRAPHENE OXIDE BY ELECTROCHEMICALLY EXFOLIATING CARBON FIBER MATERIAL

CROSS-REFERENCE TO RELATED APPLICATION

The present application claims priority from Chinese Patent Application No. 202210553260.6 filed on May 19, 2022, the contents of which are incorporated herein by reference in their entirety.

TECHNICAL FIELD

The present disclosure belongs to the technical field of nano materials and relates to a method for preparing nano-graphene oxide by electrochemically exfoliating a carbon fiber material.

BACKGROUND ART

As a main precursor for graphene production, graphene oxide has more oxygen-containing functional groups, good dispersibility in water, and great potential in the fields of transparent conductive films, printed electronics, electrochemical capacitors, lithium batteries, catalysis, separation films, biomedicine, composite materials and the like. Nano-graphene oxide has a smaller lateral size, a stronger chemical activity, and a better effect in the fields above.

At present, the preparation of the graphene oxide is mainly realized by a chemical oxidation method, including a Brodie method, a Staudenmaier method, and a Hummers method. The Hummers method is mostly commonly used. In the preparation process using the Hummers method, strong acids or strong oxidants such as concentrated sulfuric acid, perchloric acid and potassium permanganate are used, toxic gases such as nitrogen oxides and oxychlorides are also released, and the structural defects of the obtained graphene oxide are difficult to control, which is not beneficial to subsequent application. Therefore, on the premise of improving the controllable degree of the graphene oxide structure and ensuring the performance of the graphene oxide, how to reduce the use amount of the strong oxidants and the strong acids to make the preparation process greener, energy-saving and environment-friendly becomes a key point of graphene oxide research.

An electrochemical method for preparing graphene oxide is considered to be green, safe and rapid for synthesizing graphene oxide. A strong chemical oxidant is not used in the electrochemical process, current serves as a green oxidant in the process of promoting functionalization of graphene, and quality (such as degree of oxidation and defect density) of graphene oxide can be easily adjusted by adjusting the electrochemical reaction conditions. However, a precursor used in the electrochemical method is mainly natural graphite or expandable graphite. Although the cost is low, the graphite cannot be inexhaustible considering that the graphite is a natural mineral resource substance. In addition, the existing electrochemical method using natural graphite or expandable graphite as a raw material has relatively low yield, and a large amount of graphite particles obtained by centrifugation after electrolysis cannot be used subsequently. Therefore, it is important to find a large amount of readily available carbon precursors.

Based on this, if a method for preparing graphene oxide can be invented, a raw material different from natural graphite or expandable graphite is used, and the preparation process is more energy-saving and environment-friendly, has high yield and is easy for mass production, the preparation method is very advantageous to the field.

SUMMARY

The technical problems to be solved by the present disclosure are to overcome the deficiencies in the prior art and provide a method for preparing nano-graphene oxide by electrochemically exfoliating a carbon fiber material.

To solve the technical problems, the solution of the present disclosure is:

providing a method for preparing nano-graphene oxide by electrochemically exfoliating a carbon fiber material, including the following steps:

(1) building an electrochemical reaction system:

using a raw material with a carbon fiber as a basic structural unit as an anode, using a metal or graphitic carbon material as a cathode, and using a phosphate buffer solution with a neutral pH as an electrolyte in which a concentration of $PO_4^{3-}$ is 50-500 mmol/L;

(2) electrochemically exfoliating a carbon fiber during an electrolysis process, controlling a voltage between the anode and the cathode to be 3-10 V, and performing electrolysis for 8-24 h; and gradually exfoliating a carbon fiber in the anode raw material and dispersing the carbon fiber in the electrolyte solution to generate graphene oxide; and (3) performing purification to obtain nano-graphene oxide centrifuging to separate the reacted electrolyte solution, taking upper dispersion liquid, and washing away residual anions and cations; and performing ultrasonic treatment to obtain nano-graphene oxide dispersed in water and free of impurities.

As a preferred solution of the present disclosure, in step (1), a single-bundle fiber in the carbon fiber material has a radial size of 10 μm or below.

As a preferred solution of the present disclosure, in step (1), the raw material with a carbon fiber as a basic structural unit refers to carbon fiber cloth, a carbon fiber felt, a carbon fiber brush or carbon fiber paper made of a carbon fiber.

As a preferred solution of the present disclosure, in step (1), the phosphate buffer solution has a pH of 7.

As a preferred solution of the present disclosure, in step (1), the electrolyte is the phosphate buffer solution prepared from sodium dihydrogen phosphate and disodium hydrogen phosphate, or dipotassium hydrogen phosphate and sodium dihydrogen phosphate.

As a preferred solution of the present disclosure, in step (1), the electrochemical reaction system is a two-electrode system or a three-electrode system; when the two-electrode system is used, the voltage between the cathode and the anode is controlled within a range of 3-10 V; and when the three-electrode system is used (more precise control can be performed), an Ag/AgCl electrode filled with saturated KCl is used as a reference electrode, in the reaction process, the potential of the anode corresponding to the reference electrode is 1.6-3 V (vs. Ag/AgCl), and the voltage of the cathode and the anode is 3-10 V correspondingly.

As a preferred solution of the present disclosure, in step (3), the dispersion liquid is washed by dialysis to remove the residual anions and cations.

As a preferred solution of the present disclosure, in step (3), the ultrasonic treatment is performed at an ultrasonic power controlled to be 200-400 W for 10-60 min.

As a preferred solution of the present disclosure, in step (3), the finally obtained nano-graphene oxide has a lateral size below 1 μm.

DESCRIPTION OF PRINCIPLE OF THE PRESENT DISCLOSURE

The present disclosure uses carbon fiber raw materials (such as carbon fiber cloth, carbon fiber paper, a carbon fiber felt and the like woven by a carbon fiber) as an anode, and a phosphate buffer solution as an electrolyte, and applies a constant voltage to oxidize and exfoliate the anode carbon fibers to obtain graphene oxide.

For the carbon fiber raw materials, a single carbon fiber is divided into a skin layer and a core layer along a radial direction, the skin layer is formed by stacking staggered nano graphene, in an electrochemical exfoliating process, the nano graphene is oxidized in an electrolyte environment provided by a phosphate buffer solution, an interlayer spacing is enlarged, and an acting force for binding nano-graphene oxide is weakened; the surface of the carbon fiber as the anode is simultaneously subjected to an oxygen evolution reaction, oxygen bubbles are generated between graphene sheet layers, such that the nano-graphene oxide is extruded and falls off, and an effect of exfoliating few-layer graphene oxide from multi-layer graphene is realized. Phosphate anions existing in the phosphate buffer solution play roles of inserting between the graphene sheet layers and maintaining the interlayer spacing. The lateral size and the thickness of the exfoliated graphene oxide can be indirectly controlled by controlling the concentration of the phosphate buffer solution.

The existing method for preparing graphene oxide through an electrochemical reaction takes a graphite raw material as an anode, usually takes a strongly acidic solution containing a sulfate radical as an electrolyte, and is performed under an external pressure of 5 V or higher, and is high in energy consumption and not environment-friendly. Since the electrolysis mainly relies on the intercalation of anions such as sulfate, after the anions intercalate into the graphene stack structure in the graphite raw material, the exfoliation is realized, so it needs to rely on the promotion of strong acid environment and high voltage. Besides, since the intercalation process is developed from an edge to a center, a utilization rate of the graphite raw material by a traditional electrochemical method is low, a large number of graphite particles which are not fully exfoliated can be generated, and the graphite particles cannot be used after separation.

The method is different from the existing method for preparing graphene oxide by an electrochemical method. The used carbon fiber raw material has a unique nano graphene stacked structure, such that a high voltage is not required, a neutral phosphate buffer solution can be used, the carbon fiber skin layer structure can be fully utilized in the exfoliating process, and the exfoliated carbon fiber can still keep the original macroscopic morphology and can still be used in the fields of electrodes and the like. The carbon fiber can be prepared from three raw materials which can be industrially produced, namely cellulose-based fiber, pitch fiber and polyacrylonitrile fiber, and is an easily available and suitable carbon precursor.

Compared with the prior art, the beneficial effects of the present disclosure are:

1. The present disclosure uses the carbon fiber raw materials which can be industrially and continuously produced, thereby broadening a range of raw materials used in graphene oxide production.

2. The preparation process of the present disclosure has a low external voltage, and uses the phosphate buffer solution as neutral electrolyte, such that the production process is energy-saving, environment-friendly, and easy to operate.

3. The nano-graphene oxide prepared by the present disclosure has a high yield, and has a greater application potential in the fields of catalysis and the like compared with the graphene oxide with a lateral size in a micron level.

DETAILED DESCRIPTION OF THE EMBODIMENTS

Example 1

Carbon fiber cloth (a radial size of a single-bundle fiber is 10 μm) was used as an anode, a stainless steel fiber felt with an area not smaller than the carbon fiber cloth was used as a cathode, and the anode and the cathode were soaked in a phosphate buffer solution with a concentration of a phosphate ($PO_4^{3-}$) of 50 mmol/L; wherein in the phosphate buffer solution, a concentration of disodium hydrogen phosphate was 32 mmol/L and a concentration of sodium dihydrogen phosphate was 18 mmol/L; and the pH of the buffer solution was about 7, which provided a neutral electrolyte environment. The cathode and the anode were externally applied with a voltage of 3 V for electrolysis for 24 h.

Through the above steps, graphene oxide dispersed in the phosphate buffer solution was obtained, the dispersion system was centrifuged at 10,000 rpm, a lower solid was removed, a dialysis bag with a molecular weight cut-off of less than or equal to 1,000 was selected for dialysis to remove residual salt ions of the phosphate buffer solution in the dispersion liquid, and ultrasonic treatment was performed at 200 W for 60 min to obtain graphene oxide dispersed in water. The graphene oxide had a final yield larger than 90% and the oxygen content of the graphene oxide was 26.2%.

Figure 1:
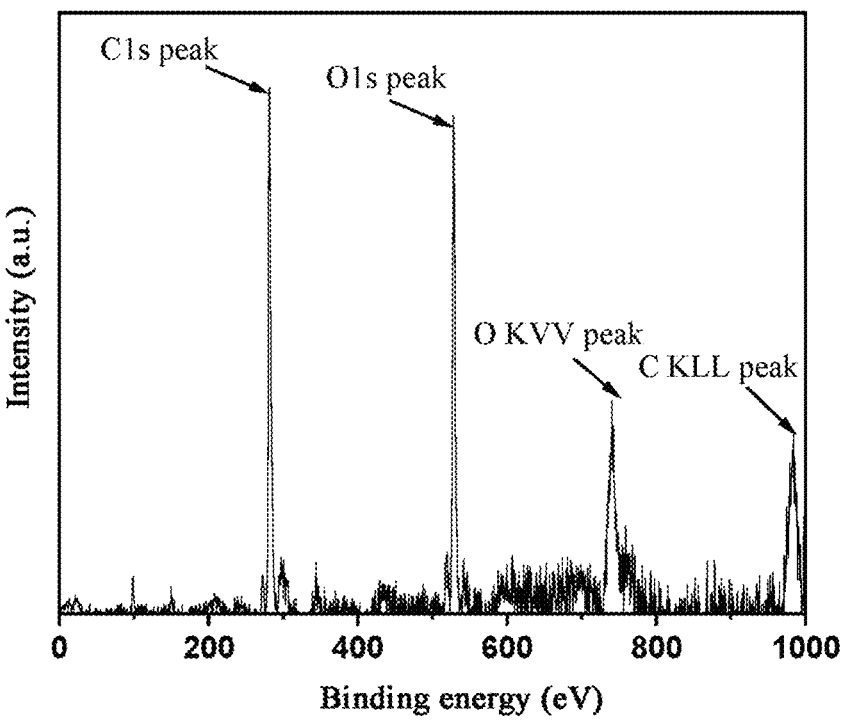
FIG. 1 is the XPS spectrogram of the graphene oxide prepared by example 1.
Figure 2:
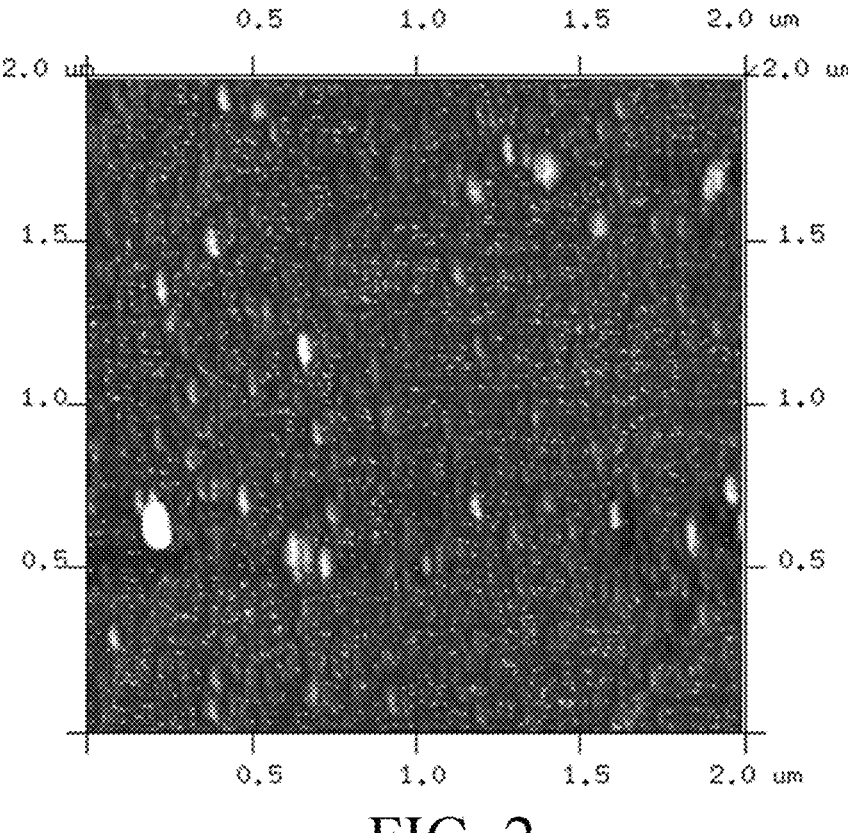
FIG. 2 is the AFM map of the graphene oxide prepared by example 1.
Figure 3:
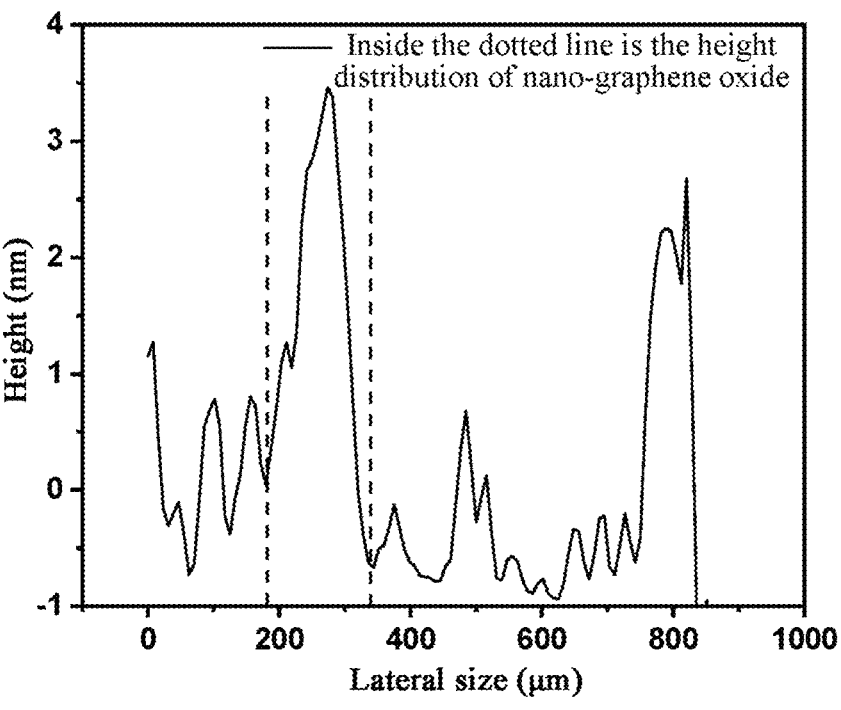
FIG. 3 is the height distribution map corresponding to FIG. 2.
Figure 4:
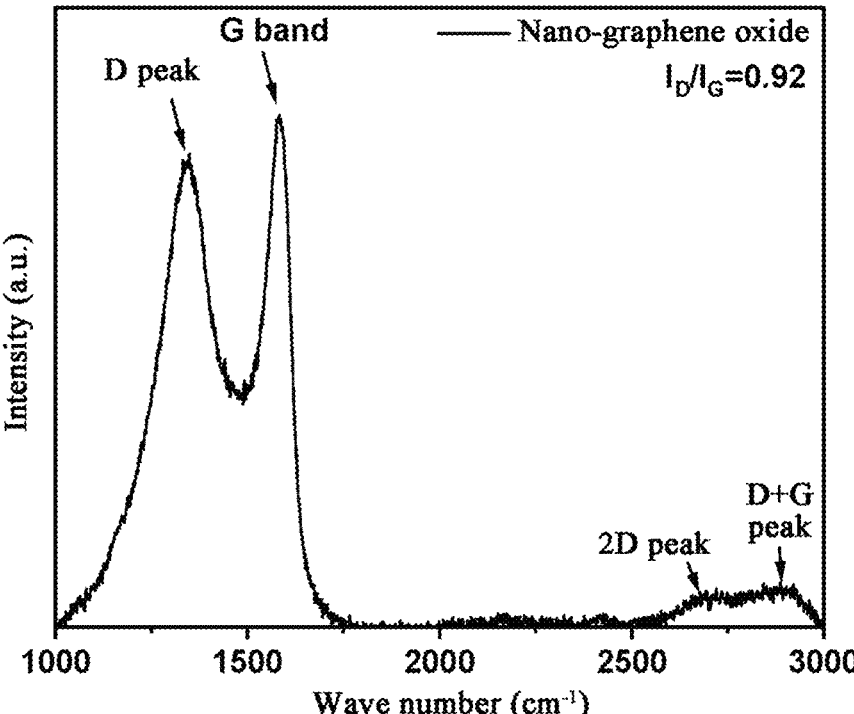
FIG. 4 is the Raman spectrogram of the graphene oxide prepared by example 1.
Figure 5:
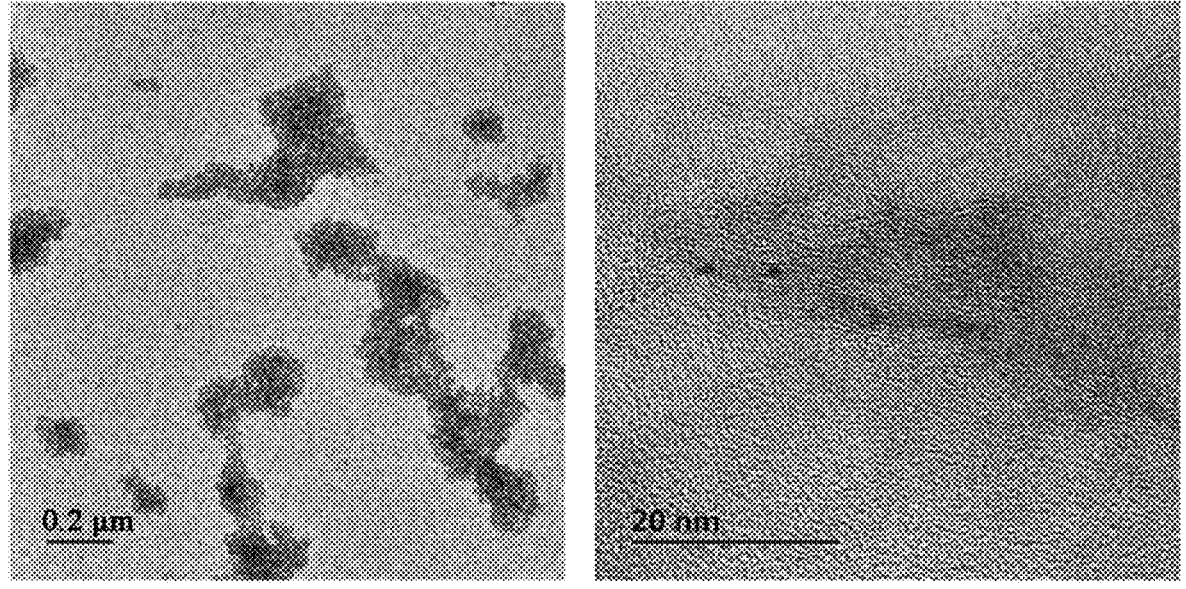
FIG. 5 is a TEM map of the graphene oxide prepared in example 1.

FIG. 1 is the XPS spectrogram of the graphene oxide, showing the high oxygen content of the graphene oxide. FIG. 2 is the AFM map of the graphene oxide, indicating that the prepared graphene oxide has a lateral size below 200 nm. FIG. 3 is the height distribution map corresponding to FIG. 2, indicating that the prepared nano-graphene oxide has a thickness of 4 nm and is formed by stacking about 2-3 layers of single-layer graphene oxide, and the number of layers is low, which meets the definition standard of the nano-graphene oxide. FIG. 4 is the Raman spectrogram of the graphene oxide, and the existence of the 2D peak indicates that the carbon material is graphene oxide. FIG. 5 is a TEM map of the graphene oxide, indicating the graphene oxide has a morphological characteristic of a two-dimensional material.

Example 2

A carbon fiber brush was used as an anode, a stainless steel fiber felt with horizontal and vertical sizes not smaller than a bristle part of the carbon fiber brush was used as a cathode, and the anode and the cathode were soaked in a phosphate buffer solution with a concentration of a phosphate of 500 mmol/L; wherein in the phosphate buffer solution, a concentration of disodium hydrogen phosphate was 320 mmol/L and a concentration of sodium dihydrogen phosphate was 180 mmol/L; and the pH of the buffer solution was about 7, which provided a neutral electrolyte environment. An Ag/AgCl electrode filled with a saturated KCl solution was used as a reference electrode, a voltage of the cathode and the anode was controlled to be 10 V for electrolysis for 8 h.

Through the above steps, graphene oxide dispersed in the phosphate buffer solution was obtained, the dispersion system was centrifuged at 10,000 rpm, a lower solid was removed, a dialysis bag with a molecular weight cut-off of less than or equal to 1,000 was selected for dialysis to remove residual salt ions of the phosphate buffer solution in the dispersion liquid, and ultrasonic treatment was performed at 400 W for 10 min to obtain graphene oxide dispersed in water. The graphene oxide had a final yield larger than 80%, a lateral size below 1 μm, and a thickness of 6 nm.

Example 3

A carbon fiber felt was used as an anode, a stainless steel fiber felt with an area not smaller than the carbon fiber felt was used as a cathode, and the anode and the cathode were soaked in a phosphate buffer solution with a concentration of a phosphate of 200 mmol/L; wherein in the phosphate buffer solution, a concentration of disodium hydrogen phosphate was 128 mmol/L and a concentration of sodium dihydrogen phosphate was 72 mmol/L; and the pH of the buffer solution was about 7, which provided a neutral electrolyte environment. The cathode and the anode were externally applied with a voltage of 5V for electrolysis for 16 h.

Through the above steps, graphene oxide dispersed in the phosphate buffer solution was obtained, the dispersion system was centrifuged at 10,000 rpm, a lower solid was removed, a dialysis bag with a molecular weight cut-off of less than or equal to 1,000 was selected for dialysis, and ultrasonic treatment was performed at 300 W for 30 min to remove residual salt ions of the phosphate buffer solution in the dispersion liquid to obtain graphene oxide dispersed in water. The graphene oxide had a final yield larger than 90%, a lateral size below 500 nm, and a thickness of 5 nm.

Example 4

Carbon fiber paper was used as an anode, a stainless steel fiber felt with an area not smaller than the carbon fiber paper was used as a cathode, and the anode and the cathode were soaked in a phosphate buffer solution with a concentration of a phosphate of 100 mmol/L; wherein in the phosphate buffer solution, a concentration of dipotassium hydrogen phosphate was 62 mmol/L and a concentration of sodium dihydrogen phosphate was 38 mmol/L; and the pH of the buffer solution was about 7, which provided a neutral electrolyte environment. The cathode and the anode were externally applied with a voltage of 6 V for electrolysis for 8 h.

Through the above steps, graphene oxide dispersed in the phosphate buffer solution was obtained, the dispersion system was centrifuged at 10,000 rpm, a lower solid was removed, a dialysis bag with a molecular weight cut-off of less than or equal to 1,000 was selected for dialysis, and ultrasonic treatment was performed at 200 W for 60 min to remove residual salt ions of the phosphate buffer solution in the dispersion solution to obtain graphene oxide dispersed in water. The graphene oxide had a final yield larger than 90%, a lateral size below 600 nm, and a thickness of 4 nm.

Example 5

Carbon fiber cloth was used as an anode, a stainless steel fiber felt with an area not smaller than the carbon fiber cloth was used as a cathode, and the anode and the cathode were soaked in a phosphate buffer solution with a concentration of a phosphate of 100 mmol/L; wherein in the phosphate buffer solution, a concentration of dipotassium hydrogen phosphate was 62 mmol/L and a concentration of sodium dihydrogen phosphate was 38 mmol/L; and the pH of the buffer solution was about 7, which provided a neutral electrolyte environment. An Ag/AgCl electrode filled with a saturated KCl solution was used as a reference electrode, electrolysis was performed with an anode potential controlled at 1.6 V (vs. Ag/AgCl), at this time, it can be measured that an external voltage of the cathode and the anode is 3 V, and the electrolysis was performed for 16 h.

Through the above steps, graphene oxide dispersed in the phosphate buffer solution was obtained, the dispersion system was centrifuged at 10,000 rpm, a lower solid was removed, a dialysis bag with a molecular weight cut-off of less than or equal to 1,000 was selected for dialysis, and ultrasonic treatment was performed at 200 W for 30 min to remove residual salt ions of the phosphate buffer solution in the dispersion solution to obtain graphene oxide dispersed in water. The graphene oxide had a final yield larger than 90%, a lateral size below 500 nm, and a thickness of 5 nm.

Example 6

Carbon fiber cloth was used as an anode, a graphite plate with an area not smaller than the carbon fiber cloth was used as a cathode, the anode and the cathode were soaked in a phosphate buffer solution with a concentration of a phosphate of 100 mmol/L; wherein in the phosphate buffer solution, a concentration of dipotassium hydrogen phosphate was 62 mmol/L and a concentration of sodium dihydrogen phosphate was 38 mmol/L; and the pH of the buffer solution was about 7, which provided a neutral electrolyte environment. An Ag/AgCl electrode filled with a saturated KCl solution was used as a reference electrode, electrolysis was performed with an anode potential controlled at 3 V (vs. Ag/AgCl), at this time, it can be measured that a voltage of the cathode and the anode is 10 V, and the electrolysis was performed for 8 h.

Through the above steps, graphene oxide dispersed in the phosphate buffer solution was obtained, the dispersion system was centrifuged at 10,000 rpm, a lower solid was removed, a dialysis bag with a molecular weight cut-off of less than or equal to 1,000 was selected for dialysis, and ultrasonic treatment was performed at 200 W for 30 min to remove residual salt ions of the phosphate buffer solution in the dispersion solution to obtain graphene oxide dispersed in water. The graphene oxide had a final yield larger than 90%, a lateral size below 1 μm, and a thickness of 7 nm.

Comparative Example 1

According to the patent of a method for continuous preparation of graphene oxide nanoplatelets (publication No. CN107215867A), the applicant uses graphite materials such as graphite paper and the like as raw materials to produce graphene oxide by an electrochemical method. In the preparation process, a high-concentration acid solution (the water content is less than or equal to 2 wt %) and a high voltage (10-1,000 V) are used, such that the energy consumption is high and the production process is not environment-friendly.

Comparative Example 2

According to the report of the reference of "Mechanically-Assisted Electrochemical Production of Graphene Oxide" in CHEMISTRY OF MATERIALS, the author uses a graphite plate as an anode, a platinum wire as a cathode, and a saturated ammonium sulfate solution as an electrolyte to perform electrochemical exfoliating. The graphene oxide prepared under different parameters has the yield below 40%. Besides, high-quality graphene oxide exists in a supernatant of graphene oxide dispersion liquid and graphite particles in a lower layer of the dispersion liquid are difficult to recycle.

The above examples only express a few implementation methods of the present disclosure. It can be seen from the above examples that no matter the carbon fiber brush, the carbon fiber cloth, or the carbon fiber felt, the carbon fiber raw materials can be prepared into graphene oxide by a one-step electrochemical method. The selection of the types or concentrations of the electrolytes affects the yield and the oxidation degree of the nano-graphene oxide. Compared with the prior art, the present disclosure has more advantages of graphene yield, environmental friendliness, and energy conservation.

What is claimed is:

1. A method for preparing nano-graphene oxide by electrochemically exfoliating a carbon fiber material, comprising the following steps:
   (1) building an electrochemical reaction system, consisting of:
   a raw material with a carbon fiber as a basic structural unit as an anode, a metal or graphitic carbon material as a cathode, and a phosphate buffer solution with a neutral pH as an electrolyte solution in which a concentration of $PO_4^{3-}$ is 50-500 mmol/L;
   (2) electrochemically exfoliating the carbon fiber;
   during an electrolysis process, controlling a voltage between the anode and the cathode to be 3-10 V, and performing electrolysis for 8-24 h; and gradually exfoliating the carbon fiber in the anode raw material and dispersing the carbon fiber in the electrolyte solution to generate graphene oxide; and
   (3) performing purification to obtain the nano-graphene oxide;
   centrifuging to separate the reacted electrolyte solution, taking upper dispersion liquid, and washing away residual anions and cations; and performing ultrasonic treatment to obtain the nano-graphene oxide dispersed in water and free of impurities.

2. The method according to claim 1, wherein in step (1), a single-bundle fiber in the carbon fiber has a radial size of 10 μm or below.

3. The method according to claim 1, wherein in step (1), the raw material with the carbon fiber as the basic structural unit refers to carbon fiber cloth, a carbon fiber felt, a carbon fiber brush or carbon fiber paper made of a carbon fiber.

4. The method according to claim 1, wherein in step (1), the phosphate buffer solution has a pH of 7.

5. The method according to claim 1, wherein in step (1), the electrolyte is the phosphate buffer solution prepared from sodium dihydrogen phosphate and disodium hydrogen phosphate, or dipotassium hydrogen phosphate and sodium dihydrogen phosphate.

6. The method according to claim 1, wherein in step (1), the electrochemical reaction system is a two-electrode system or a three-electrode system; when the two-electrode system is used, the voltage between the cathode and the anode is controlled within a range of 3-10 V; and when the three-electrode system is used, an Ag/AgCl electrode filled with saturated KCl is used as a reference electrode, in the reaction process, the potential of the anode corresponding to the reference electrode is 1.6-3 V, and the voltage of the cathode and the anode is 3-10 V correspondingly.

7. The method according to claim 1, wherein in step (3), the dispersion liquid is washed by dialysis to remove the residual anions and cations.

8. The method according to claim 1, wherein in step (3), the ultrasonic treatment is performed at an ultrasonic power controlled to be 200-400 W for 10-60 min.

9. The method according to claim 1, wherein in step (3), the finally obtained nano-graphene oxide has a lateral size below 1 μm.

* * * * *